United States Patent
Marques

(10) Patent No.: US 6,922,200 B1
(45) Date of Patent: Jul. 26, 2005

(54) DELIVERING A GRAPHICAL OBJECT TO A BROWSER

(75) Inventor: Janet Marques, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 311 days.

(21) Appl. No.: 09/997,759

(22) Filed: Nov. 30, 2001

(51) Int. Cl.[7] ................................................ G09G 5/00
(52) U.S. Cl. ...................................... 345/619; 345/788
(58) Field of Search ............................... 345/801–807, 345/619–649, 781, 788

(56) References Cited

U.S. PATENT DOCUMENTS

| | | | | |
|---|---|---|---|---|
| 5,422,729 A | * | 6/1995 | Yoshida | 358/400 |
| 5,530,947 A | * | 6/1996 | Takasaki et al. | 345/619 |
| 6,118,546 A | * | 9/2000 | Sanchez et al. | 358/1.6 |
| 6,317,760 B1 | * | 11/2001 | Byrd et al. | 715/513 |
| 6,363,421 B2 | * | 3/2002 | Barker et al. | 709/223 |
| 6,671,723 B2 | * | 12/2003 | Nguyen et al. | 709/224 |
| 6,779,152 B1 | * | 8/2004 | Conner et al. | 715/509 |

* cited by examiner

*Primary Examiner*—Matthew Luu
(74) *Attorney, Agent, or Firm*—Christopher J. Brokaw; Hickman Palermo Truong & Becker LLP

(57) ABSTRACT

Techniques are provided for delivering a graphical object to a browser including the steps of receiving a request that requires delivery of the graphical object to the browser, wherein the graphical object is not a table; and in response to the request, generating a script which, when executed by the browser, causes the browser to render the graphical object as a particular table.

24 Claims, 11 Drawing Sheets

```
public class HtmlGraphics {
  private HtmlCell mBackgroundCell;
  private Vector mRowVect;
  private int mWidthPix;
  private int mHeightPix;
  public HtmlGraphics(String pBgColor, int pWidthPix,
                      int pHeightPix) { }
     .
     .
     .

public void fillRect(Color pColor, Text pText,
                       Text pBubbleText, int pX, int pY,
                       int pWidthPix, int pHeightPix) { }
     .
     .
     .

public String render() { }
     .
     .
     .

}
```

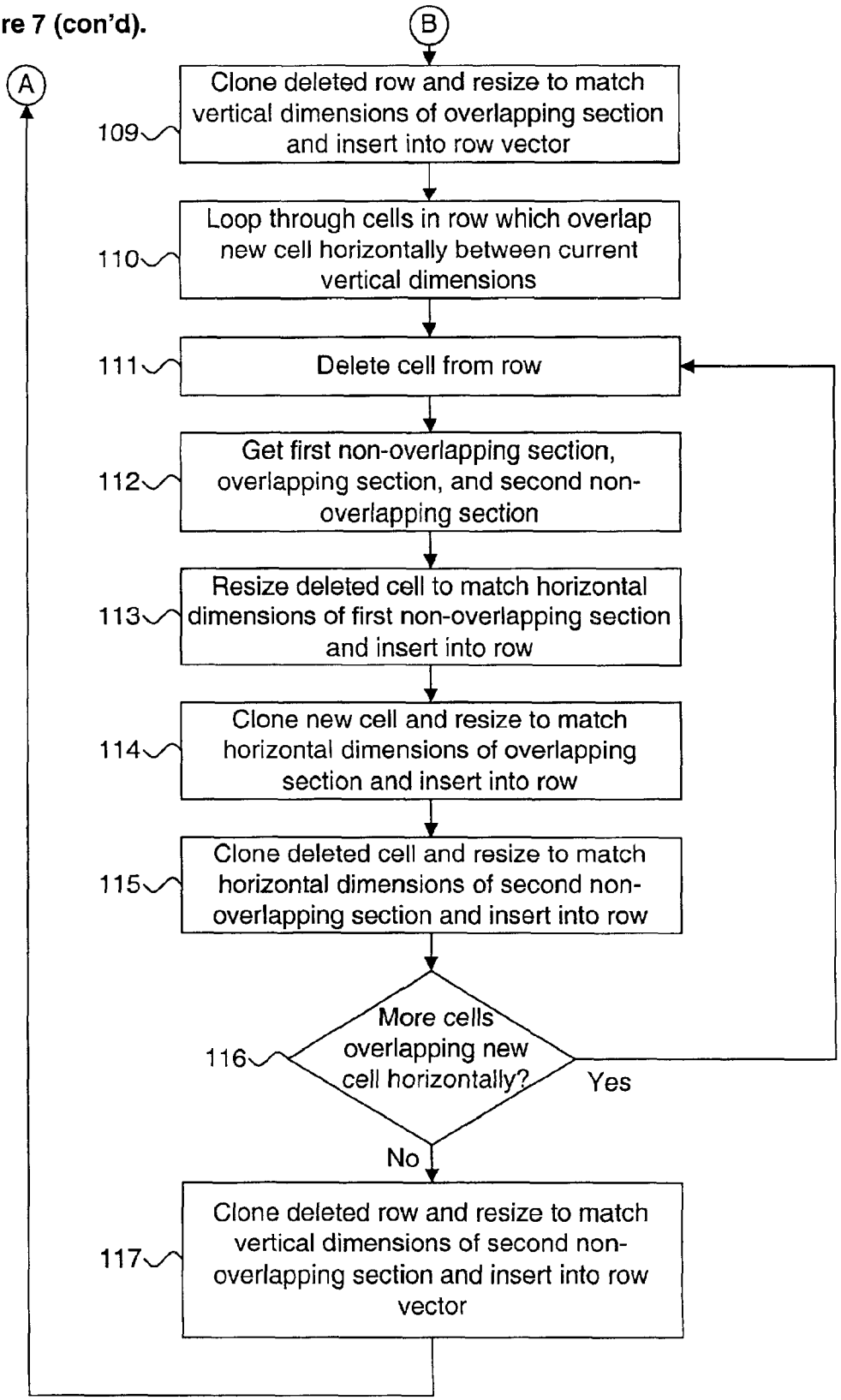
Figure 7 (con'd).

140

DELIVERING A GRAPHICAL OBJECT TO A BROWSER

FIELD OF THE INVENTION

The present invention relates in general to graphics generation and, in particular, to delivering a graphical object to a browser.

BACKGROUND OF THE INVENTION

The Worldwide Web ("Web") is the medium of choice for publishing information on-line over the Internet, a widely-used public internetwork globally interconnecting countless client and server computer systems. The Internet provides a transport mechanism through standardized communication protocols, such as the Hypertext Transport Protocol (HTTP), for communicating Web content in the form of text, graphics, sounds, animations, and video.

Web content is exchanged using a form of scripting language, such as the Hypertext Markup Language (HTML), a tag-delimited scripting language interpretable by a majority of currently available Web browsers. In HTML, Web content is embedded in statements that are interpreted by a receiving Web browser and formatted into readable form using tags included in each statement. The tags can include text and display attributes, such as color and text style, as well as references to downloadable content and hyperlinks.

During a Web browsing session, a user can request additional content from a Web server by selecting hyperlinks embedded in each Web page. The hyperlink is relayed by the Web browser as a form of request that is answered by the Web server with downloaded Web content. The download operations can be particularly bandwidth-intensive for those Web pages containing large data objects, such as graphics.

Web content containing graphics poses a trade-off between server and client functionality. Graphics can include both pictorial content, such as photo-realistic images, and illustrative content, including charts and graphs for modeling quantitative information. Graphical Web content generated at a Web server can require a specialized display server which generates the Web content as a separate downloadable file, typically in GIF or JPEG format. Graphics files tend to be large and can require long download times. Typically, an applet will be downloaded from the Web server to generate graphics on the client. However, each applet is application-dependent and can also require long download times.

Web pages can also include dynamically-generated content. Such content enables interactive sessions to provide customized Web content and increased user interest. Dynamically-generated Web content consisting only of text can easily be generated by a Web server which processes the user request and sends back a script containing the requested text embedded as the customized Web content.

Dynamically-generated Web content containing graphics, however, presents a trade-off between customizing Web content and respecting bandwidth limitations. Higher complexity graphs, such as pictorial images, require substantially more bandwidth and can result in slow download times from the Web server.

Three approaches provide graphical Web content to individual Web browsers. In the first approach, graphical Web content is generated in advance of download on a Web server. A graphics engine using a graphics toolkit, such as the Java Abstract Window toolkit (AWT), generates graphics for download and stores the graphical data for retrieval by Web servers upon client request. This approach requires a priori knowledge of expected graphical Web content and limits the level of user interactivity to selecting from amongst pre-generated graphics. As well, this approach also suffers from long download times and is memory intensive.

In the second approach, a graphics engine using a graphical toolkit generates graphical content ad hoc rather than ahead of download time. New graphical content is generated responsive to each new user request and requires the download of a large image. This approach imposes long download times and also requires the user to wait out a sometimes time-consuming graphics generation routine upon each request. This approach is usually memory intensive.

In the third approach, Web browser-executable modules, such as applets, are used to render graphical images on a client at the time of request. This approach has the advantage of decreasing download times for individual graphical images, but still requires the download of individual applets prior to the generation of each graphic. Moreover, applets are generally non-portable and application-dependent.

In the fourth prior art approach graphical images are created as a tag delimited script constructed in the same order as expressed in the script. This approach has the advantage of decreased download times, but has the disadvantage of requiring an application dependent engine that is not extendable.

Therefore, there is a need for an application-independent approach to provide dynamically generated low-complexity graphics, such as charts and graphs, using standard Web-browser functionality. Preferably, such an approach would convert graphics into a Web page script interpretable by a standard Web browser, thereby allowing ad hoc Web content retrieval.

There is a further need for an approach to create low-complexity charts and graphs expressed as tables in a tag-delimited script, such as HTML. Such an approach would create graphical Web content structured into a table by an engine executing in conjunction with a Web server.

There is a further need to provide a standard application-independent engine for generating graphical Web content and exporting a standard application programming interface shared with standardized graphics toolkits, such as the Java AWT.

SUMMARY OF THE INVENTION

The present invention provides a system and process for generating graphical Web objects, including low-complexity graphics, such as charts and graphs, embedded within a Web page. A graphical Web object is specified as a table definition included in a tag-delimited script describing the Web page, such as in HTML Individual rows and cells within the table specify the characteristics of the graphical Web object, including color, text, text style, hyperlinks, and bubble text. Each individual cell represents a uniform rectangular region and combinations of the uniform rectangular regions can be formed on a logical canvas to generate various shapes and styles. As the shapes are drawn, any overlap between horizontal and vertical rendered regions is resolved. The logical canvas is then rendered as the table definition and downloaded to the requesting client as a tag-delimited script.

An embodiment of the present invention provides an application-independent system and process for dynamically generating low-complexity graphics embedded as Web content using a tag-delimited script. A graphics object class defining a logical canvas and including a vector of row objects is specified. Each graphics object class contains a set of cell objects defining display attributes for a uniform rectangular region. A shape is drawn onto the logical canvas by sequentially parsing through each row object in the vector and through each cell object contained therein to consistently structure the logical canvas. The logical canvas is converted into a table encoded in a tag-delimited script by converting in order each row object into a row within the table, and each cell object into a cell within each row.

A further embodiment provides an application-independent system and process for specifying graphical Web content as a table written in a tag-delimited script. A graphics object class is defined and includes state variables and at least one method for drawing a shape. A vector is included as one such state variable and includes at least one row object reference. Each row object reference includes at least one cell object reference. Logic encapsulated within the graphics object class is encoded and defines the at least one shape method to generate a selectable shape within a logical canvas. A table is rendered as a tag-delimited script from an instance of the graphics object class containing the selectable shape(s) rendered from each at least one row object reference and each at least one cell object reference.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 3 is a data structure diagram showing, by way of example, pseudocode for a graphics object class 50 for use in the system of FIG. 2.

DETAILED DESCRIPTION

Figure 1:
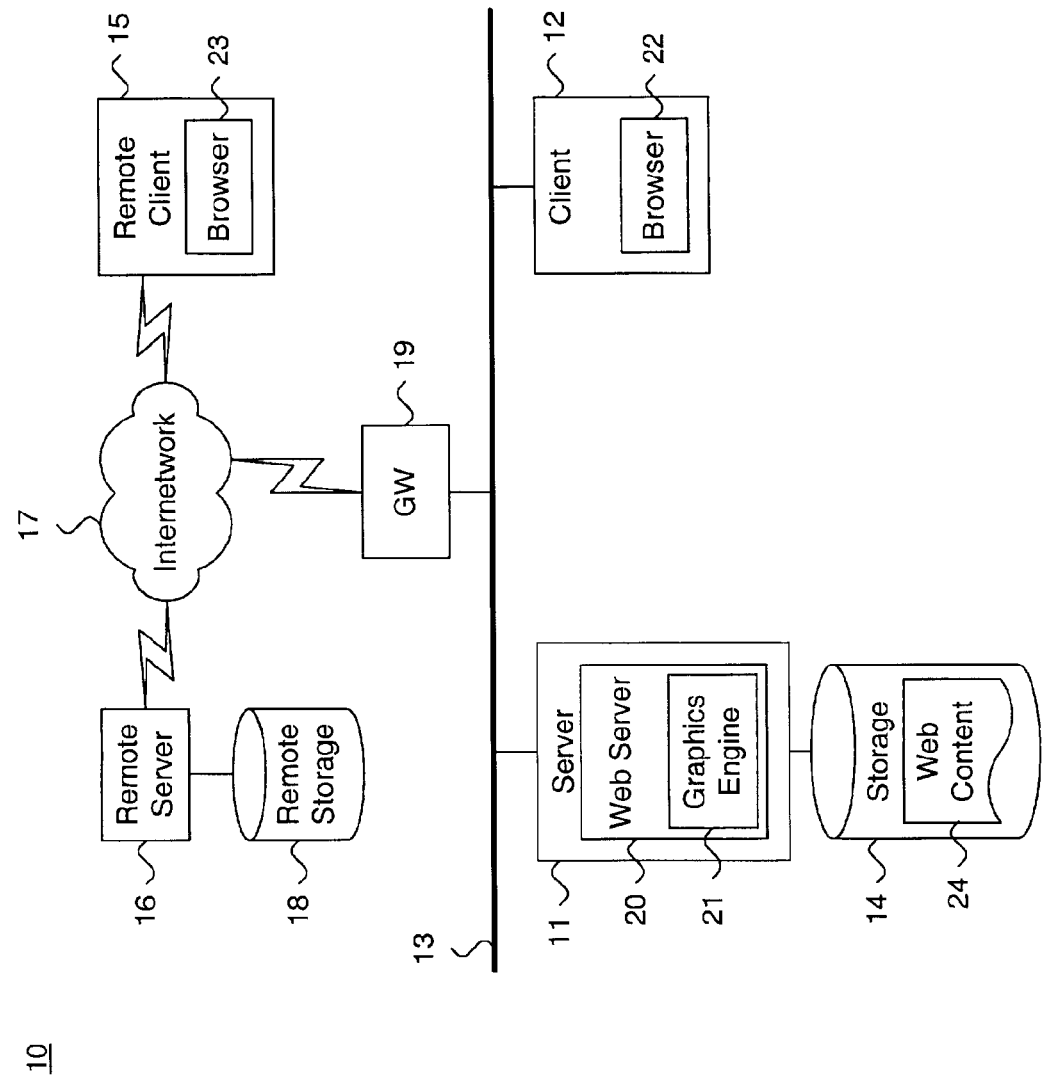
FIG. 1 is a block diagram showing a distributed computing environment, including an application-independent system for dynamically generating low-complexity graphics embedded as Web content using a tag-delimited script, in accordance with the present invention.

FIG. 1 is a block diagram showing a distributed computing environment 10, including an application-independent system for dynamically generating low complexity graphics embedded as Web content using a tag-delimited script, in accordance with the present invention. A server 11 is interconnected to a client 12 via an intranetwork 13. The client 12 sends requests for Web content via a Web browser 22 to a Web server 20 executing on the server 11. The Web server 20 retrieves the requested Web content from a storage device 14, which is sent in reply back to the requesting Web browser 22.

Alternatively, the Web browser 22 can request Web content from a remote server 16 which is retrieved from a remote storage device 18 and downloaded via an internetwork 17, such as the Internet. The internetwork 17 is interconnected to the intranetwork 13 via a gateway 19 or similar bridging device. As well, a remote client 15 executes a Web browser 23 and can also retrieve Web content from the Web server 20 or the remote server 16. Other network configurations and topologies, and arrangements of clients, server, and components are feasible, as would be recognized by one skilled in the art.

The Web browser 22 can display text and graphical Web content, including pictorial and illustrative content, such as photo-realistic images and charts and graphs, respectively. Low complexity graphical Web content can be generated and rendered by the server 11 using a graphics engine 21, as further described below with reference to FIG. 2. The graphics engine 21 executes within with the Web server 20 to generate low-complexity graphical Web content embedded within individual Web pages as a table definition.

Low-complexity graphical Web content includes non-exclusively charts and graphs rendered in two or three dimensions. Complex graphical Web content includes pictorial Web content, such as photo-realistic images, which are typically stored as downloadable files. Complex graphical Web content is typically generated offline in advance of download.

Responsive to a client request received from the Web browser 22, the Web server 20 executes the graphics engine to construct, build and render an embedded graphical object. The graphical object is rendered as a table in a tag-delimited script, such as HTML, which is downloaded to the Web browser 22. The Web browser 22 then interprets the downloaded HTML script to generate the embedded graphical object.

In the described embodiment, the Web browser 22 is a standard HTML-compatible Web browser, such as the Internet Explorer, licensed by Microsoft Corporation, Redmond, Wash., and Navigator, licensed by Netscape Corporation, Mountain View, Calif. The graphics object library used by the graphics engine exports a standard API used by the Java abstract Window Toolkit (AWT), licensed by Sun Microsystems, Inc., Palo Alto, Calif.

The individual computer systems, including servers 11, 16 and clients 12, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Servers need not necessarily include peripheral devices and user interfacing means. Program code, including software programs and data, are loaded into the RAM for execution and processing by the CPU and results are generated for display, output, transmittal, or storage.

Figure 2:
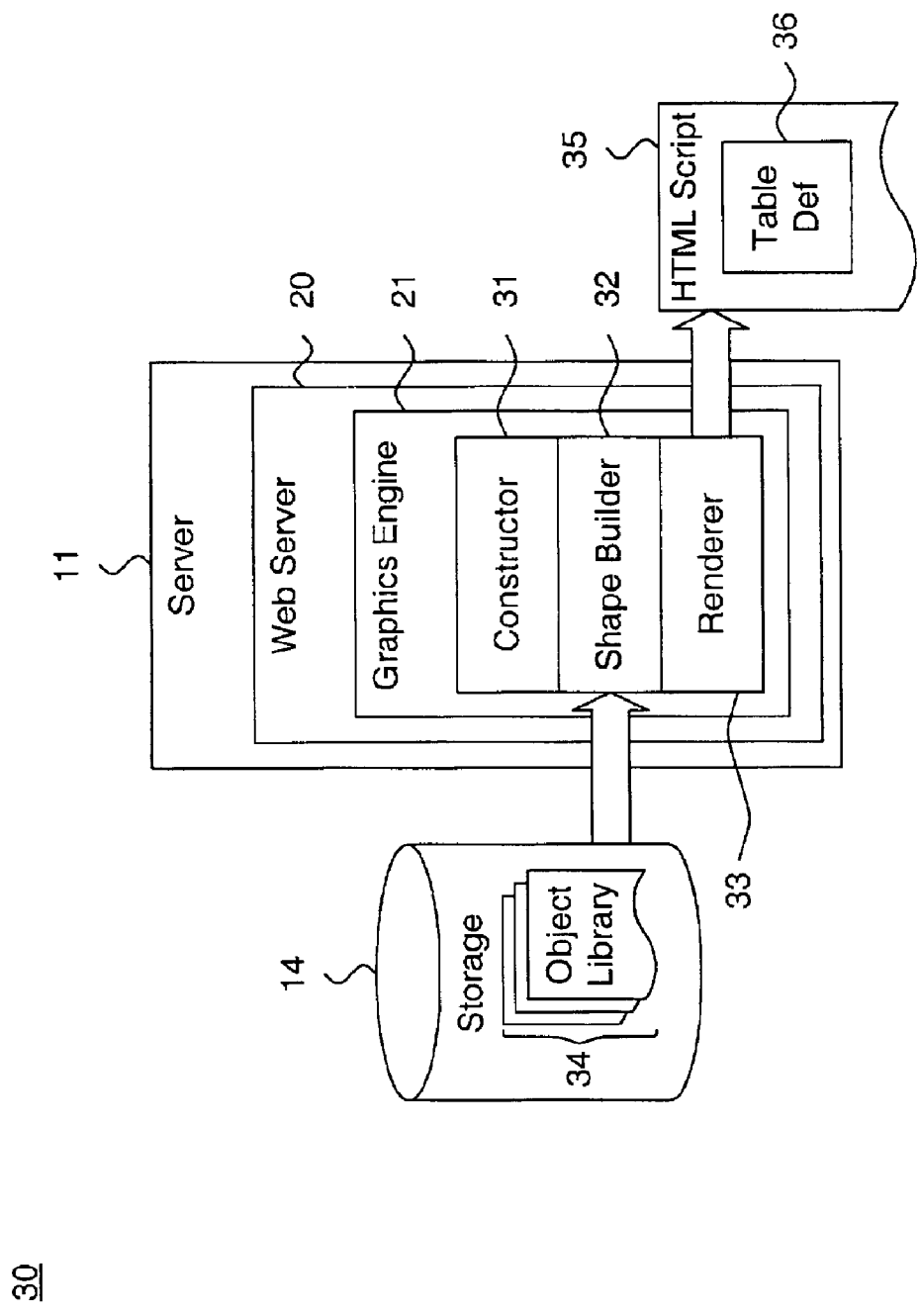
FIG. 2 is a block diagram showing the application-independent system for dynamically generating low-complexity graphics embedded as Web content using a tag-delimited script of FIG. 1.

FIG. 2 is a block diagram showing the application-independent system 30 for dynamically generating low-complexity graphics embedded as Web content using a tag-delimited script. The system 30 includes the server 11 executing the Web server 20 which executes the graphics engine 21. In the described embodiment, HTML is used as the HTTP-compliant language with which to generate tag-delimited scripts. For convenience and clarity of presentation, HTML is used in the present Detailed Description; however, one skilled in the art would appreciate that other forms of equivalent tag-delimited languages, such as the Extensible Markup Language (XML), could be used in place of HTML.

The Web server 20 answers requests for Web content from Web browsers 22 (shown in FIG. 1) by retrieving the requested Web content 24 from the storage device 14. The Web content 24 includes requests for graphical Web objects that are generated and rendered as tables encoded as HTML script statements by the graphics engine 21. The graphics engine 21 includes three functional modules: constructor 31, shape builder 32, and renderer 33. The constructor 21 references a graphics object library 34 to instantiate an instance of a graphics object class, as further described below with reference to FIGS. 4A–B. The graphics object library 34 contains a graphics object class definition, as further described below with reference to FIG. 3, that define and encapsulate individual methods for drawing graphical shapes.

The shape builder 32 draws shapes onto the graphics object while resolving any overlaps. Each shape is generated independently and is made up one of more uniform rectangular regions which are drawn onto the logical canvas. The uniform rectangular regions can overlap and the shape builder 32 identifies and resolves any overlaps between the uniform rectangular regions.

Finally, the renderer 33 converts the graphical object into a table definition 36 within an HTML script 35. The table definition 36 is then downloaded, interpreted and displayed by a standard Web browser 22 (shown in FIG. 1).

Each of the foregoing modules is a computer program, procedure or module written as source code in a conventional programming language, such as the C++ or Java programming language, and is presented for execution by the CPU as object or byte code, as is known in the art. The various implementations of the source code and object and byte codes can be held on a computer-readable storage medium or embodied on a transmission medium in a carrier wave. The system 30 operates in accordance with a sequence of process steps, as further described below with reference to FIG. 5.

FIG. 3 is a data structure diagram showing, by way of example, psuedocode for a graphics object class 50 for use in the system of FIG. 2. By way of example, the graphics object class 50 defines a global object class HTMLGraphics that defines member variables and encapsulated methods. One graphics object is created for each area of low-complexity graphical Web content, such as a chart or graph. The graphics object is then rendered into an HTML table.

Several member variables are defined within the graphics object class 50. A private variable mBackgroundCell contains background attributes, such as color. The vector initially contains one large row. A private member variable of datatype vector mRowVect ("vector") contains a plurality of HTML row objects. Private member variables mWidthPix and mHeightPix specify the width and height of the logical canvas, respectively. Each HTML row object contains one or more HTML cell objects containing an individual renderable uniform rectangular region. Thus, HTML cell objects are converted into individual cells within a given row corresponding to the HTML row object. The complete set of HTML row objects form the table defined by the HtmlGraphics object.

The individual HTML row objects generally do not overlap and can be arranged in numerical order within the vector. The vector is updated as new shapes containing uniform rectangular regions are drawn. A public constructor method HtmlGraphics is defined to instantiate a new HtmlGraphics graphics object 50.

The HtmlGraphics graphics object class 50 also defines a plurality of publicly-defined methods to build individual graphical items. In the described embodiment, the following methods are defined.

(1) HtmlGraphics( ): Constructs a new HtmlGraphics object.

(2) clearRect(int, int, int, int): Clears the specified rectangle by filling the rectangle with the background color of the current drawing surface.

(3) draw3DRect(int, int, int, int, boolean): Draws a three-dimensional highlighted outline of the specified rectangle.

(4) drawArc(int, int, int, int, int, int): Draws the outline of a circular or elliptical arc covering the specified rectangle.

(5) drawChars(char[], int, int, int, int): Draws the text given by the specified character array, using the current font and color.

(6) drawImage(Image, int, int): Draws an image onto the logical canvas.

(7) drawLine(int, int, int, int): Draws a line, using the current color, between the points (x1, y1) and (x2, y2).

(8) drawOval(int, int, int, int): Draws the outline of an oval.

(9) drawPolygon(int[], int[], int): Draws a closed polygon defined by arrays of x and y coordinates.

(10) drawPolygon(Polygon): Draws the outline of a polygon defined by the specified Polygon object.

(11) drawPolyline(int[], int[], int): Draws a sequence of connected lines defined by arrays of x and y coordinates.

(12) drawRect(int, int, int, int): Draws the outline of the specified rectangle.

(13) drawRoundRect(int, int, int, int, int, int): Draws an outlined round-cornered rectangle using the current color.

(14) drawString(String, int, int): Draws the text given by the specified string, using the current font and color.

(15) fill3DRect(int, int, int, boolean): Paints a three-dimensional highlighted rectangle filled with the current color.

(16) fillArc(int, int, int, int, int, int): Fills a circular or elliptical arc covering the specified rectangle.

(17) fillOval(int, int, int, int): Fills an oval bounded by the specified rectangle with the current color.

(18) fillPolygon(int[], int[], int): Fills a closed polygon defined by arrays of x and y coordinates.

(19) fillPolygon(Polygon): Fills the polygon defined by the specified Polygon object with the current color.

(20) fillRect(int, int, int, int): Fills the specified rectangle with the current color.

(21) fillRoundRect(int, in, int, int, int): Fills the specified rounded corner rectangle with the current color.

(22) setColor(Color): Sets the current color to the specified color.

(23) setFont(Font): Sets the current font to the specified font.

These method descriptions are based on Java's AWT documentation: htp://java.sun.com/products/jdk/1.1/docs/api/java.awt.Graphics.html.

For example, the public method FillRect fills a specified rectangle using various attributes, such as color, text and bubble text. Bubble text is a form of contextual help that is automatically displayed when the cursor is placed over a given object in a displayed Web page. The left and right edges of the specified rectangle are located at pX and pX+pWidth. The top and bottom edges are at pY and pY+PLength. The resulting specified rectangle covers an area of PWidth pixels wide by PHeight pixels tall.

Finally, the HtmlGraphics graphics object class 50 encapsulates a public method render which converts each graphics object into an HTML table interpretable by a Web browser 22 (shown in FIG. 1). Rendering is further described below with reference to FIG. 8.

Figure 4A:
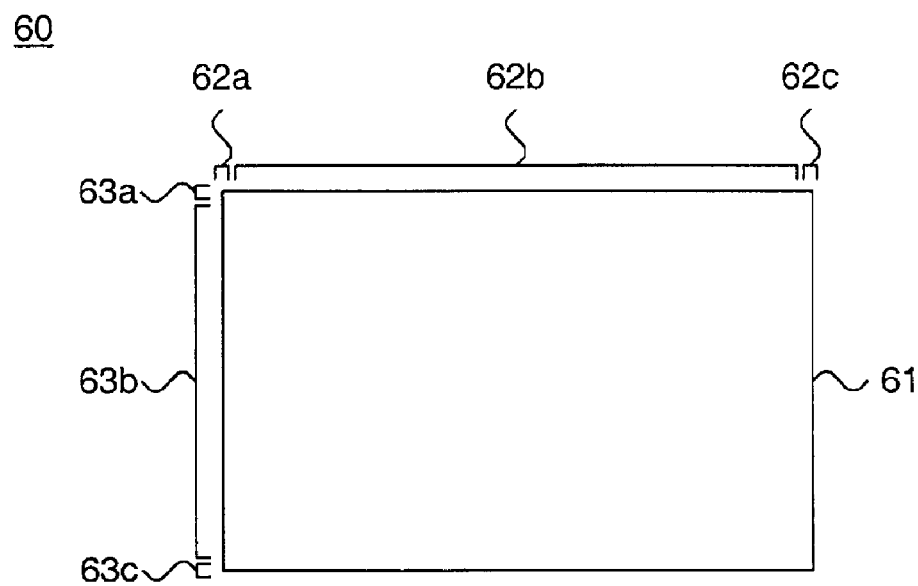
FIGS. 4A–B are schematic diagrams showing a logical canvas of a rendered graphics object generated by the system of FIG. 2.
Figure 4B:
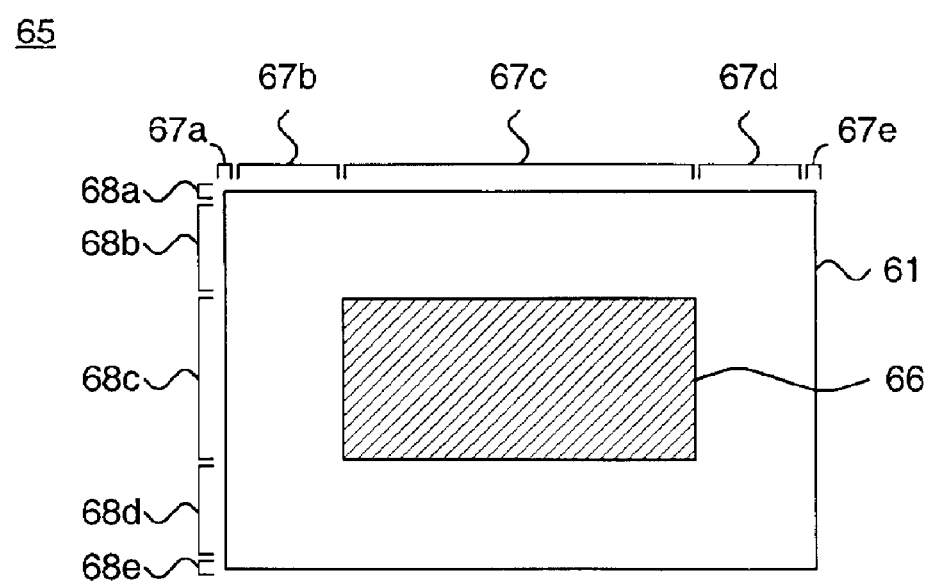

FIGS. 4A–B are schematic diagrams showing a logical canvas of a graphics object generated by the system of FIG. 2. Referring first to FIG. 4A, a depiction 60 of a blank logical canvas with border 61 including three rendered horizontal regions 62*a–c* and three rendered vertical regions 63*a–c* is shown. Each of the rendered regions 62*a–c*, 63*a–c* define non-overlapping graphics objects generated in sequential order from left to right and top to bottom. The ordering of the rendered regions 62*a–c*, 63*a–c* is critical to the conversion of the logical canvas 61 to a table definition 36 in an HTML script 35 (shown in FIG. 2). Each of the regions 62*a–c*, 63*a–c* is converted into individual cells within the table definition 36.

Referring next to FIG. 4B, a depiction 65 of the logical canvas 61 with the addition of a solid rectangular region 66 is shown. The addition of the solid rectangle 66 requires the rendered regions 62*a–c*, 63*a–c* of the logical canvas 61 to be redefined such that the solid rectangular region 66 and the areas adjacent define separately rendered regions 67*a–e*, 68*a–e*. In particular, the solid rectangular region 66 overlaps the rendered horizontal region 62*b*. Accordingly, rendered horizontal region 62*b* must be split into three rendered horizontal regions 67*b–67d*. Similarly, the solid rectangular region 66 overlaps rendered vertical region 63*b*, which must be split into three rendered vertical regions 68*b–d*.

In the described embodiment, each of the rendered vertical regions 68*a–e* corresponds to individual rows within the table definition 36. As well, each of the rendered horizontal regions 67*a–e* corresponds to individual cells within each of the rows.

Figure 5:
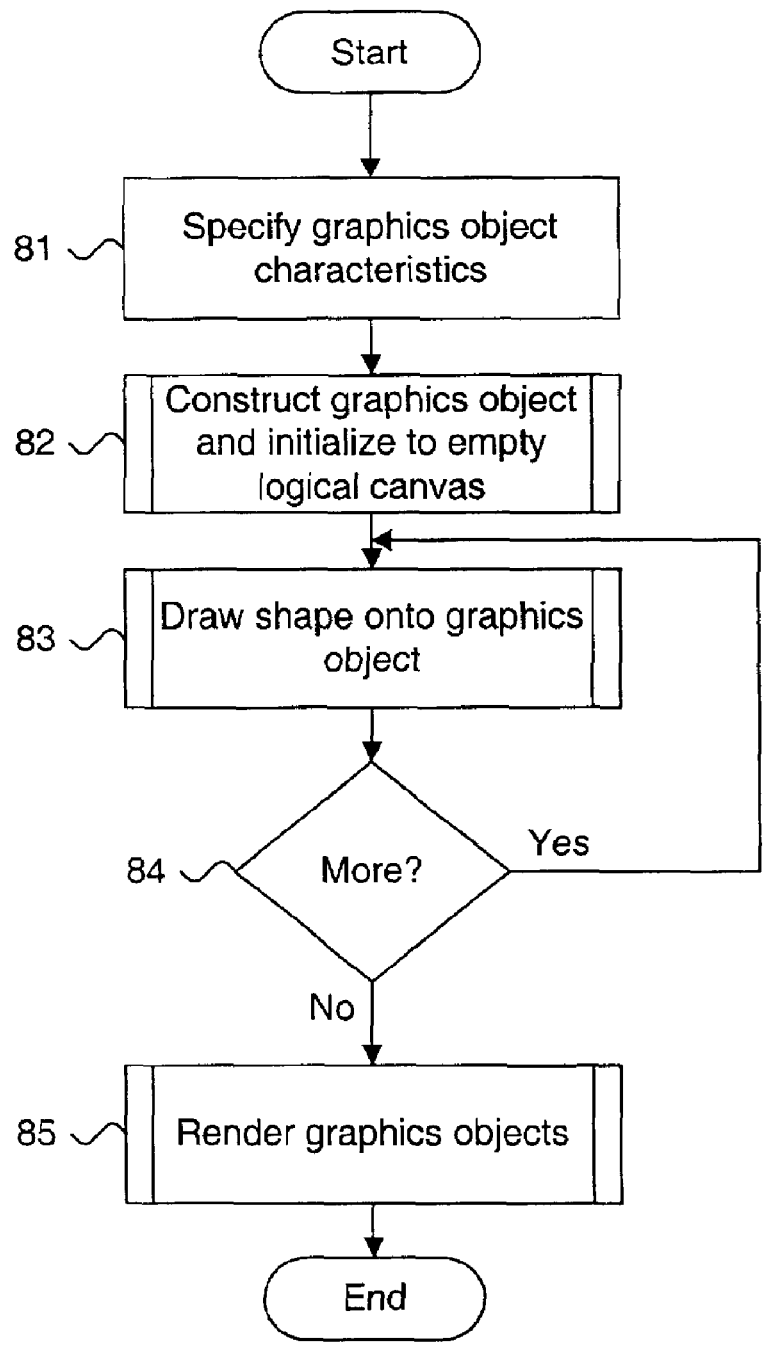
FIG. 5 is a flow diagram showing an application-independent process for dynamically generating low-complexity graphics embedded as Web content using a tag-delimited script, in accordance with the present invention.

FIG. 5 is a flow diagram showing an application-independent process 80 for dynamically generating low-complexity graphics embedded as Web content using a tag-delimited script, in accordance with the present invention. The process 80 implements the graphics engine 21 and is called by the Web server 20 (shown in FIG. 1) to render and generate a low-complexity graphics object embedded within a requested Web page.

The process 80 generates a graphics object as follows. First, the characteristics of the graphics object, such as background color and dimensions, are specified (block 81). Next, the graphics object is constructed and initialized to an empty logical canvas using the characteristics specified (block 82), as further described below with reference to FIG. 6. Next, shapes are iteratively drawn onto the canvas using an encapsulated method (block 83), as further described below with reference to FIG. 7. The particular method to execute depends on the shape needed. Processing continues as more shapes are drawn (block 84). On the completion of iterative processing (block 84), the graphics object is rendered (block 85), as further described below with reference to FIG. 8. The rendering of a graphics object converts the logical canvas 61 into a table definition 36 embedded within an HTML script 35 (shown in FIG. 2). The process then ends.

Figure 6:
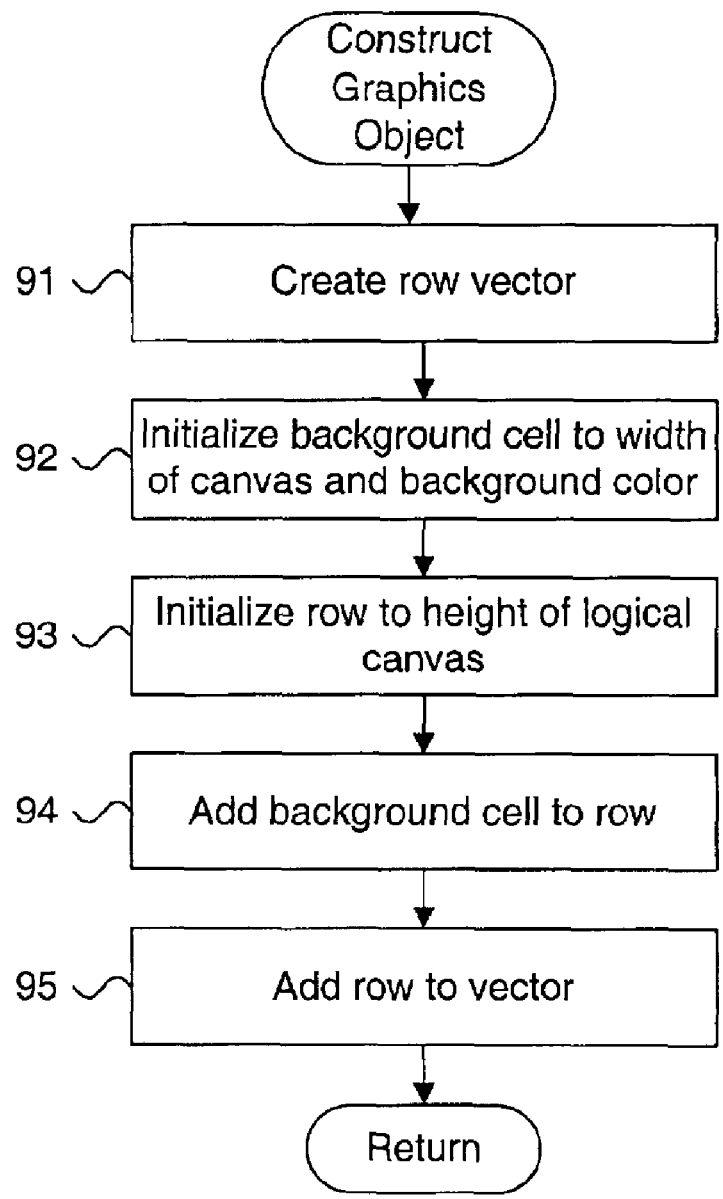
FIG. 6 is a flow diagram showing the routine for constructing a graphics object for use in the process of FIG. 5.

FIG. 6 is a flow diagram showing the routine 90 for constructing a graphics object for use in the process of FIG. 5. The purpose of this routine is to instantiate an instance of an HtmlGraphics graphics object class 50 (shown in FIG. 3) and initialize the parameters specified therein.

First, a row vector is created (block 91). Each row within the row vector will be rendered as an HTML row within the table definition 36 (shown in FIG. 2). A background cell is initialized to the width of the canvas and background color (block 92). The row is also initialized to the height of the logical canvas (block 93). The background cell is added to the row (block 94) and the row is added to the vector (block 95). Thus, the empty logical canvas 61 is generated. The routine then returns.

Figure 7:
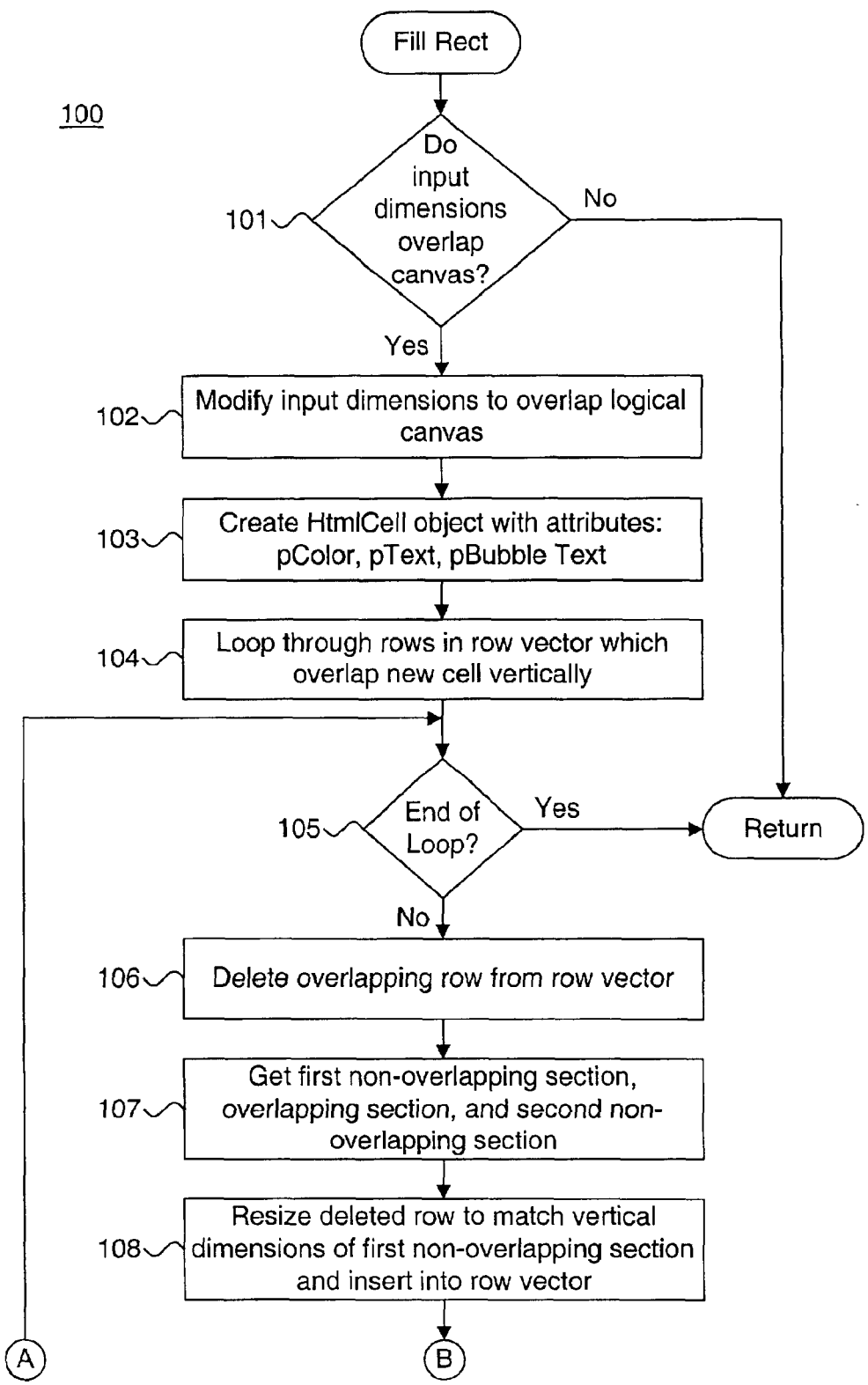
FIG. 7 is a flow diagram showing, by way of example, a routine for filling a rectangle for use in the process of FIG. 5.

FIG. 7 is a flow diagram showing, by way of example, a routine 100 for drawing a shape for use in the process of FIG. 5. This routine illustrates the creation of a rectangular region having a solid background, such as the solid rectangular region 66 (shown in FIG. 4B).

Briefly, the dimensions of the shapes are independently defined and any overlap between the horizontal and vertical rendered regions must be resolved. The solid rectangular region constitutes a single uniform rectangular region and is thus the simplest form of a shape to draw.

More complex shapes could likewise be defined by combining several uniform rectangular regions. The routines described above with reference to FIG. 3 for drawing more complex shapes build on the basic operations described for drawing a rectangular region (routine 100) and the necessary operations would be apparent to one skilled in the art. For example, a non-filled circle could be formed by generating a plurality of one pixel uniform rectangular regions arranged in accordance with the equation $2\pi r$, where r is the radius of the region.

The first step in routine 100 checks if the input dimensions overlap the logical canvas 61 (block 101). If the shape is outside the region to be rendered, then the routine returns. Otherwise, the input dimensions are modified to fully overlap the logical canvas 61 (block 102). Next, an HTML cell object is created with the attributes pColor, pText and pBubbleText (block 103).

The solid rectangular region is iteratively processed for vertical overlap by looping through the rows in the corresponding row vector which vertically overlap the new region (block 104), as follows. First, the overlapping row is deleted from the row vector (block 106) and the first non-overlapping, overlapping and second non-overlapping sections are obtained (block 107). The deleted row is resized to match the vertical dimensions of the first non-overlapping section and inserted into the row vector (block 108). The deleted row is cloned and resized to match the vertical dimensions of the overlapping section and inserted into the row vector (block 109).

Next, the solid rectangular region is iteratively processed for horizontal overlap by looping through the cells in the corresponding row which horizontally overlap the new region (block 110), as follows. First, the cell is deleted from the row (block 111). Next, the first non-overlapping, overlapping and second non-overlapping sections are obtained (block 112). The deleted cell is resized to match the horizontal dimensions of the first non-overlapping section and inserted into the row (block 113). The new region is cloned and resized to match the horizontal dimensions of the overlapping section and inserted into the row (block 114). The deleted cell is resized to match the horizontal dimensions of the second non-overlapping section and inserted into the row (block 115). Processing continues until all cells which overlap the new cell horizontally have been processed (block 116).

As well, to complete processing for vertical overlap, the deleted row is cloned and resized to match the vertical dimensions of the second non-overlapping section and inserted into the row vector (block 117). Processing continues until all rows which overlap the new cell vertically have been processed (block 105), after which the routine returns.

Figure 8:
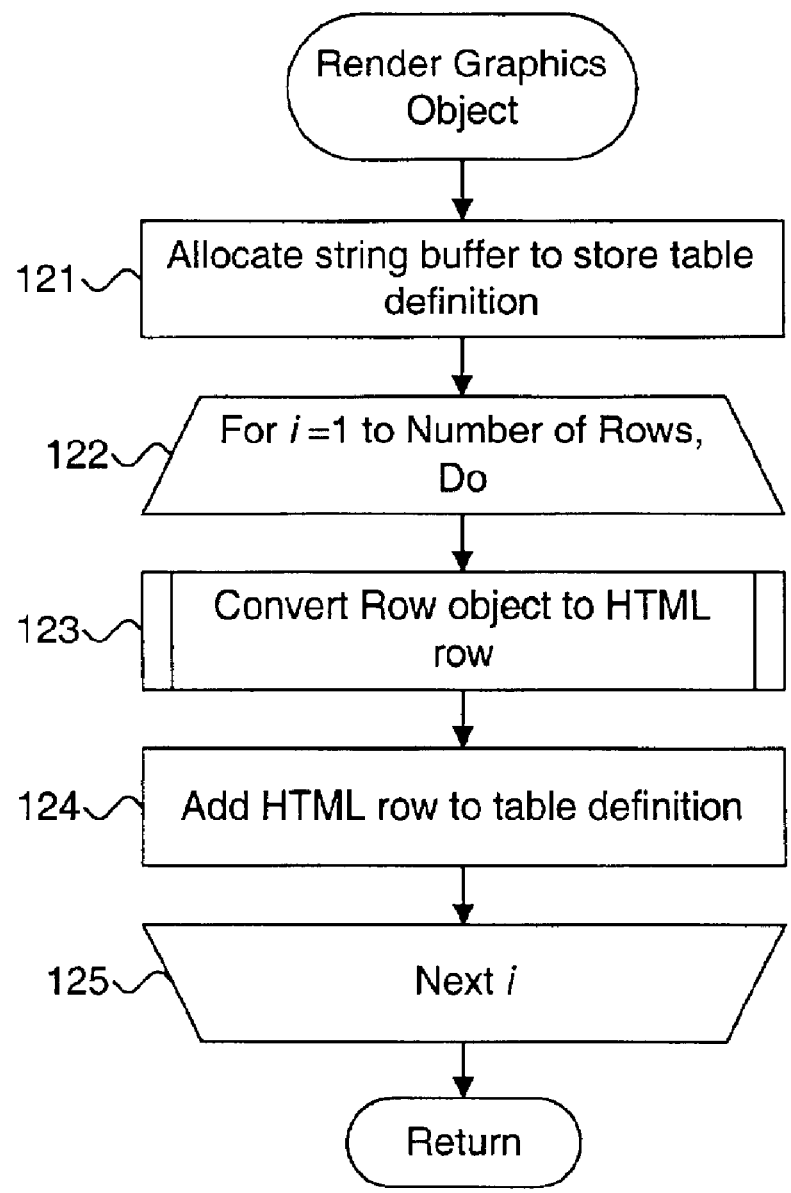
FIG. 8 is a flow diagram showing the routine for rendering a graphics object for use in the process of FIG. 5.

FIG. 8 is a flow diagram showing the routine 120 for rendering a graphics object for use in the process of FIG. 5. The purpose of this routine is to convert a graphics object into a table definition 36 embedded in an HTML script 35 (shown in FIG. 2).

Thus, a string buffer is allocated (block 121) to store the HTML table definition. The rows of the vector are iteratively processed (blocks 122–125), as follows. First, the current row is converted to an HTML row (block 123) and the HTML row is added to the table definition 36 (block 124), as further described below with reference to FIG. 9. Processing continues for each of the remaining rows (block 125), after which the routine returns.

Figure 9:
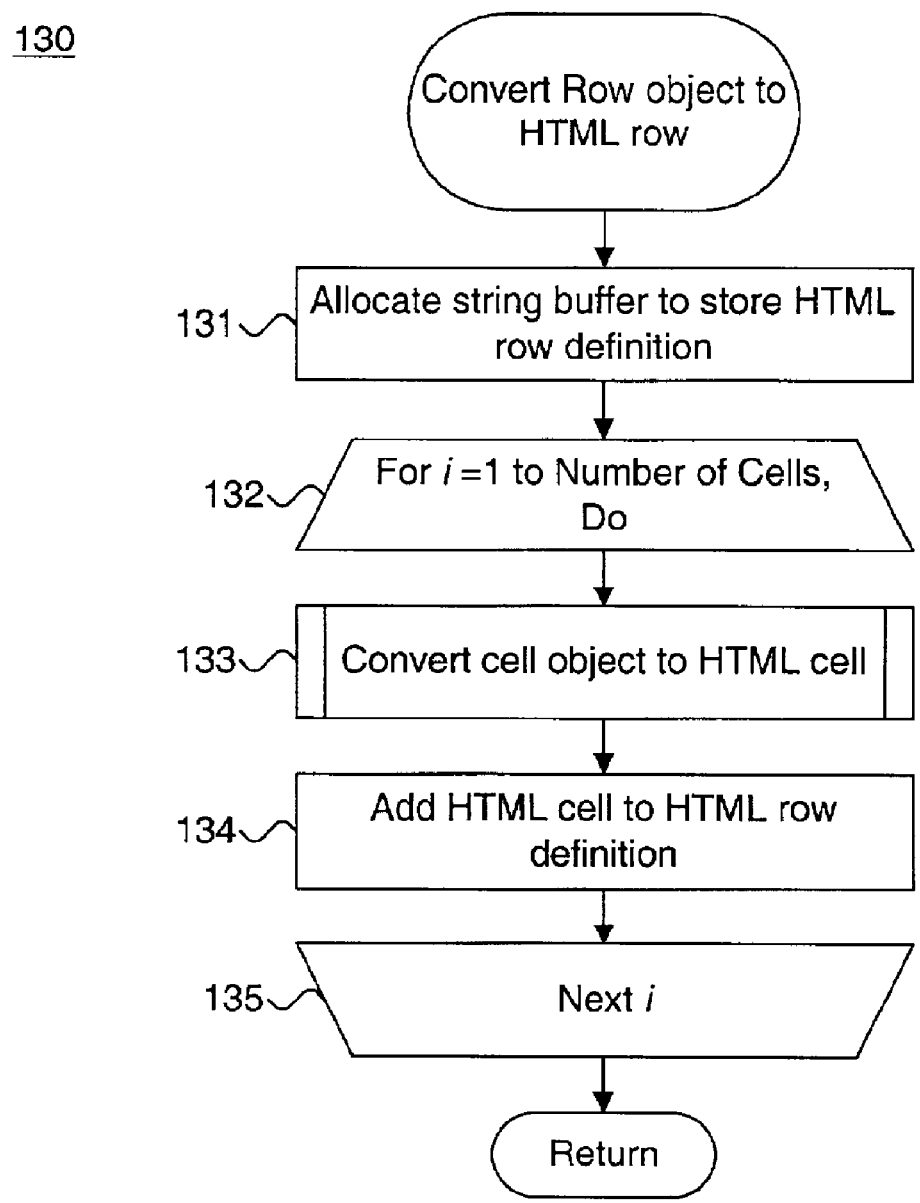
FIG. 9 is a flow diagram showing the routine for converting a row object to an HTML row for use in the routine of FIG. 8.

FIG. 9 is a flow diagram showing the routine 130 for converting a row object to an HTML row for use in the routine of FIG. 8. The purpose of this routine is to render each of the rows in the table definition 36 as an HTML statement.

Thus, a string buffer is allocated (block 131) to store the HTML row definition. Next, each of the cells within the row is iteratively processed (block 132–135), as follows. First, the current cell is converted to an HTML cell (block 133) as further described below with reference to FIG. 10, and is added as an HTML cell within the HTML row definition (block 133). Iterative processing of each of the remaining cells within the HTML row continues (block 135), after which the routine returns.

Figure 10:
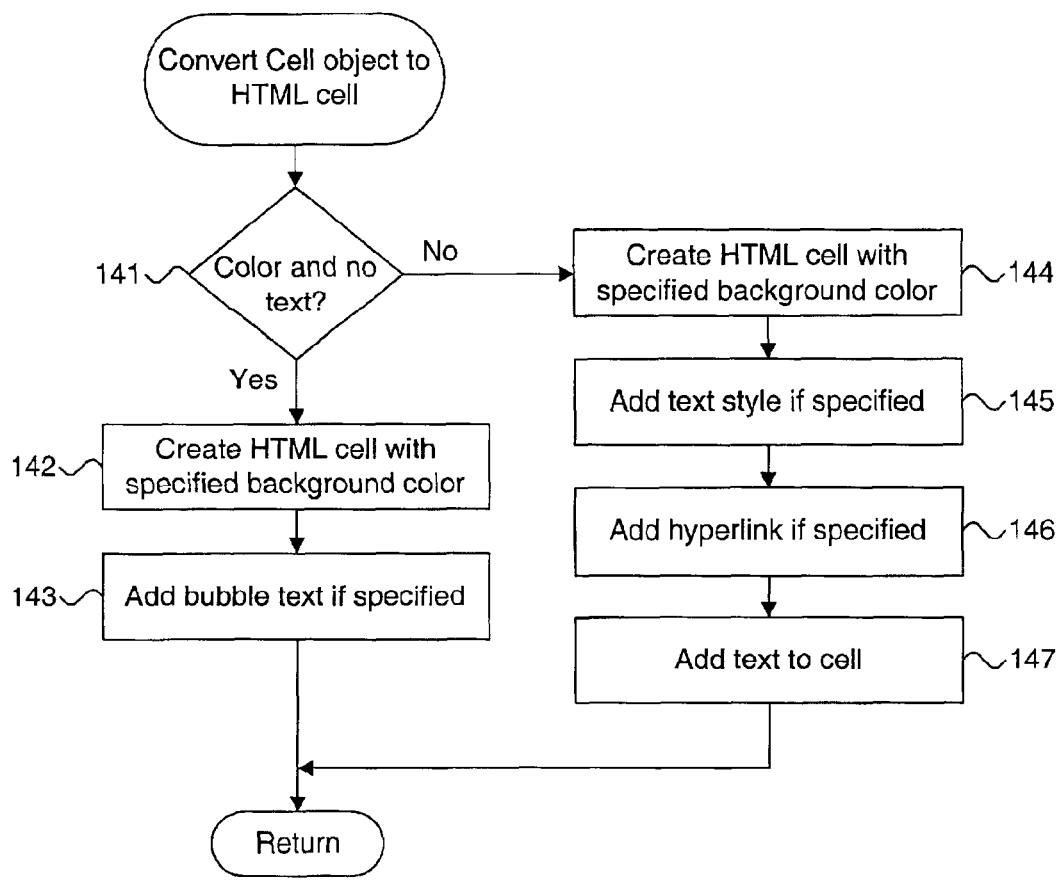
FIG. 10 is a flow diagram showing the routine for converting a cell object to an HTML cell for use in the routine of FIG. 9.

FIG. 10 is a flow diagram showing the routine 140 for converting a cell object to an HTML cell for use in the routine of FIG. 9. The purpose of this routine is to render an individual cell within a row of the table definition 36 embedded in the HTML script 35.

Thus, if the cell has a specified color but does not contain text (block 141), the HTML cell is created with the specified background color (block 142), using the specified width and height. In the described embodiment, the color is specified as an RGB value in hexadecimal notation (#CCCCCC). A filename of a .gif file is also used which contains a one-pixel transparent image necessary to render the graphical object (t.gif). Finally, bubble text is added if specified (block 143), after which the routine returns.

An example of an HTML table definition 36 containing color and no text is as follows:

<table width="100" border="0" cellspacing="0"
        cellpadding="0">
    <tr>
    <td bgcolor="#CCCCCC" colspan="100" width="100"
        height="30" nowrap>
    <img src="t.gif" width="100" height="30" border="0">
    </td>
    </tr>
    </table>

Otherwise, if the cell contains color and text (block 141), the HTML cell is created with the specified background color (block 144), using the height and width specified. If specified, the style of text is added (block 145). If a hyperlink is specified, the hyperlink is added (block 146). The hyperlink text is added to the cell (block 147), after which the routine returns.

An example of an HTML table definition 36 containing a graphic object containing color and text is as follows:

<table width="100" border="0" cellspacing="0"
        cellpadding="0">
    <tr>
    <td bgcolor="#CCCCCC" colspan="100" width="100"
        height="30" nowrap>
    <div align="center">abc</div>
    </td>
    </tr>
    </table>

While the invention has been particularly shown and described as referenced to the embodiments thereof, those skilled in the art will understand that the foregoing and other changes in form and detail may be made therein without departing from the spirit and scope of the invention.

What is claimed is:

1. A method of delivering a graphical object to a browser comprising the steps of:
   receiving a request that requires delivery of the graphical object to the browser; and
   in response to the request, performing the steps of:
      constructing the graphical object,
      converting the constructed graphical object into a table definition, and
      generating a script, based on the table definition, which, when executed by the browser, causes the browser to render the graphical object as a particular table.

2. The method of claim 1, wherein the browser is a particular browser that has not been supplemented by application dependant functionality or a browser-executable script.

3. The method of claim 1, wherein the step of generating the script comprises:
   accessing a logical canvas containing the graphical object; and
   generating the script based on said logical canvas.

4. The method of claim 3, wherein the step of generating the script based on said logical canvas includes generating a table definition and generating the script based on said table definition, wherein said table definition defines the particular table.

5. The method of claim 4, wherein the particular table contains a set of rows, and wherein the step of generating the particular table based on the graphical object in the logical canvas comprises:
   determining whether the graphical object in the logical canvas overlaps a row in the set of rows; and
   if the graphical object completely overlaps the row, then coloring the row a particular color.

6. The method of claim 5, further comprising the step of choosing the particular color based on the graphical object.

7. The method of claim 5, further comprising the steps of:
if the graphical object partially overlaps the row, subdividing the row into one or more subdivided rows, wherein each of the one or more subdivided rows is either fully overlapped by the graphical object, partially overlapped by the graphical object, or not overlapped by the graphical object; and
for each partially overlapped row of the one or more subdivided rows, subdividing the particular partially overlapped row horizontally.

8. The method of claim 7, wherein the one or more subdivided rows include a particular partially overlapped row that comprises one or more cells, and wherein the step of subdividing the particular partially overlapped row horizontally comprises:
determining whether the graphical object overlaps each cell of the one or more cells in the particular partially overlapped row; and
if the graphical objects completely overlap a first cell of the one or more cells in the particular partially overlapped row, then coloring the first cell the color of the graphical object.

9. The method of claim 8, further comprising the step of:
if the graphical object partially overlaps a second cell of the one or more cells in the particular partially overlapped row, subdividing the second cell into two or more cells so that each of the two or more cells are either fully overlapped by the graphical object or fully non-overlapped by the graphical object.

10. The method of claim 1, wherein the script is a tag-delimited script containing a table definition, the particular table definition comprises one or more rows, and each row of the one or more rows comprises one or more cells.

11. A computer-readable medium carrying one or more sequences of instructions which, when executed by one or more processors, causes the one or more processors to perform the method recited in claim 1.

12. A computer-readable medium carrying one or more sequences of instructions which, when executed by one or more processors, causes the one or more processors to perform the method recited in claim 2.

13. A computer-readable medium carrying one or more sequences of instructions which, when executed by one or more processors, causes the one or more processors to perform the method recited in claim 3.

14. A computer-readable medium carrying one or more sequences of instructions which, when executed by one or more processors, causes the one or more processors to perform the method recited in claim 4.

15. A computer-readable medium carrying one or more sequences of instructions which, when executed by one or more processors, causes the one or more processors to perform the method recited in claim 5.

16. A computer-readable medium carrying one or more sequences of instructions which, when executed by one or more processors, causes the one or more processors to perform the method recited in claim 6.

17. A computer-readable medium carrying one or more sequences of instructions which, when executed by one or more processors, causes the one or more processors to perform the method recited in claim 7.

18. A computer-readable medium carrying one or more sequences of instructions which, when executed by one or more processors, causes the one or more processors to perform the method recited in claim 8.

19. A computer-readable medium carrying one or more sequences of instructions which, when executed by one or more processors, causes the one or more processors to perform the method recited in claim 9.

20. A computer-readable medium carrying one or more sequences of instructions which, when executed by one or more processors, causes the one or more processors to perform the method recited in claim 10.

21. The method of claim 1, wherein the graphical object is not a table.

22. A computer-readable medium carrying one or more sequences of instructions which, when executed by one or more processors, causes the one or more processors to perform the method recited in claim 21.

23. A method of delivering a graphical object to a browser comprising the steps of:
receiving a request that requires delivery of the graphical object to the browser,
wherein the graphical object is not a table, and
in response to the request, generating a script which, when executed by the browser,
causes the browser to render the graphical object as a particular table,
wherein the step of generating the script comprises the steps of:
accessing a logical canvas containing the graphical object, and
generating the script based on said logical canvas.

24. A computer-readable medium carrying one or more sequences of instructions which, when executed by one or more processors, causes the one or more processors to perform the method recited in claim 23.

* * * * *

UNITED STATES PATENT AND TRADEMARK OFFICE
CERTIFICATE OF CORRECTION

PATENT NO. : 6,922,200 B1  
DATED : July 26, 2005  
INVENTOR(S) : Janet Marques Zabel It is certified that error appears in the above-identified patent and that said Letters Patent is hereby corrected as shown below:

<u>Title page,</u>  
Item [75], Inventor, please delete "Janet Marques" and insert -- Janet Marques Zabel --.

Signed and Sealed this

Thirteenth Day of September, 2005

JON W. DUDAS  
*Director of the United States Patent and Trademark Office*